United States Patent [19]

Sano et al.

[11] 4,367,292

[45] Jan. 4, 1983

[54] METHOD FOR MANUFACTURE OF POWDER COMPOSITION FOR CORDIERITE

[75] Inventors: Shiro Sano, Nagoya; Hiroyoshi Takagi, Kasugai, both of Japan

[73] Assignees: Agency of Industrial Science & Technology; Ministry of International Trade & Industry, both of Tokyo, Japan

[21] Appl. No.: 288,022

[22] Filed: Jul. 29, 1981

[30] Foreign Application Priority Data

Aug. 5, 1980 [JP] Japan .................................. 55-107444
Aug. 5, 1980 [JP] Japan .................................. 55-107445

[51] Int. Cl.³ .............................................. C04B 35/18
[52] U.S. Cl. ................................... 501/119; 501/153; 501/154; 423/328; 423/329; 423/330
[58] Field of Search ................. 501/109, 118, 19, 153, 501/154; 423/328, 329, 330

[56] References Cited

U.S. PATENT DOCUMENTS

| | | | |
|---|---|---|---|
| 3,032,894 | 5/1962 | Ishino et al. | 423/330 |
| 3,885,977 | 5/1975 | Lachman et al. | 501/119 |
| 3,959,444 | 5/1976 | Yokoi et al. | 423/329 |

*Primary Examiner*—James Poer
*Attorney, Agent, or Firm*—Oblon, Fisher, Spivak, McClelland & Maier

[57] ABSTRACT

A powder composition for producing cordierite is obtained by mixing a water-soluble magnesium salt; a water-soluble aluminum salt; a silicon source selected from the group consisting of organic silicon compounds, silica, silica sol and, silica gel; and an organic solvent, adding to the resultant mixture an ammonia-alkaline solution of ammonium carbonate thereby producing a precipitate, separating the precipitate, and drying the separated precipitate.

4 Claims, No Drawings

METHOD FOR MANUFACTURE OF POWDER COMPOSITION FOR CORDIERITE

BACKGROUND OF THE INVENTION

This invention relates to a method for the manufacture of a super-fine homogeneous powder composition for producing cordierite having components in desired component ratios.

Cordierite ($2MgO.2Al_2O_3.5SiO_2$) exhibits very low thermal expansion over a wide range of temperatures and offers outstanding resistance to the thermal shocks exerted thereupon in case of an abrupt temperature change. Cordierite, therefore, is widely used in refractory heat plates, honeycomb structures for cleaning exhaust gas from automobiles, and physicochemical refractory materials.

Generlly cordierite is obtained by combining kaoline, talc, magnesite, aluminum oxide, magnesium hydroxide, clay, etc. and burning the resultant mixture. Theoretically, cordierite is composed of 13.7% of MgO, 34.9% of $Al_2O_3$, and 51.4% of $SiO_2$. Generally, the MgO content of cordierite may vary within the range of 10 to 16%, the $Al_2O_3$ content within the range of 33 to 41%, and the $SiO_2$ content within the range of 43 to 56%. Recently, synthesis of cordierite by use of synthetic raw materials instead of naturally occurring raw materials has come to prevail. It has been ascertained that presence of impurities, particularly calcium oxide and alkalis, increases the thermal expansion coefficient and exerts adverse effects upon the ability to resist thermal shocks.

With a view to producing cordierite of high purity, there have been proposed melting methods. Methods of this kind developed to date have invariably proved impracticable. Various methods developed for the production of the composition $2MgO.2Al_2O_3.5SiO_2$ by the combination of MgO, $Al_2O_3$, and $SiO_2$ each of high purity generally comprise combining raw materials as shown below and causing reaction of the raw materials by burning the resultant mixtures.

(1) [$2MgO + 2Al_2O_3$] (spinel) and $5SiO_2$
(2) Reaction product of $2MgO + 5SiO_2$ and $2Al_2O_3$
(3) Reaction product of $2Al_2O_3 + 5SiO_2$ and $2MgO$
(4) $2MgO + 2Al_2O_3 + 5SiO_2$ (In this case, the oxides are mixed and are allowed to react in the mixed state.)

These are all powder mixing methods. Particularly in the case of (1), the reaction involved requires a mineralizer (such as, for example, LiF or $MgF_2$) and entails a possibility of causing air pollution with fluorine. This method has a disadvantage that the product is deficient in electrical properties and refractoriness.

When the raw materials of high purity are mixed in amounts conforming to the theoretical composition of cordierite and the resultant powder mixture is pressed into a desired shape, set in a furnace, and fired, the product of the firing exhibits the lowest thermal expansion coefficient and high resistance to thermal shock. By this firing method, since the formation of liquid phase generally observed at low temperatures fails to occur, the firing temperature rises and, consequently, the temperature range in which the firing is allowed to proceed is narrowed, making difficult the firing itself. Moreover, the product of the firing exhibits properties which are not always consistent.

An object of this invention is to provide a novel method for the manufacture of a powder composition for producing cordierite which is readily converted into desired cordierite by firing.

SUMMARY OF THE INVENTION

To accomplish the object described above according to this invention, there is provided a method which comprises preparing water containing a water-soluble magnesium salt, a water-soluble aluminum salt, and at least one silicon source selected from the group consisting of (a) an organic silicon compound and (b) at least one member selected from the group consisting of finely divided silicon oxide, silica gel, and silica sol in amounts calculated to correspond to a cordierite percentage composition as Mg, Al, and Si, mixing this water with a water-soluble organic solvent thereby producing a mixed solution, then adding to said mixed solution an ammonia-alkaline ammonium carbonate solution thereby inducing precipitation, and separating and drying the precipitate.

DESCRIPTION OF THE PREFERRED EMBODIMENTS

According to the present invention, cordierite having the components contained in theoretical proportions known to give the lowest possible thermal expansion can be obtained at will in the form of a finely divided perfectly homogeneous mixture. The salient feature of this method resides in the manner in which silica and magnesia, the most important components of cordierite, are prepared.

As the raw material for silicon, there is used either an organic silicon compound or a silicon source selected from among finely divided silicon oxide, silica sol, and silica gel.

First, the formulation involving use of an organic silicon compound will be described. The first step is to dissolve a water-soluble magnesium salt and a water-soluble aluminum salt in water. To the resultant aqueous solution, a water-soluble organic solvent is added and thereafter an organic silicon compound is added. In this case, the water-soluble salts and the organic silicon compound are to be added in amounts conforming to a desired cordierite composition. In this case, the addition of the organic silicon compound is made not to an aqueous solution containing Mg ion and Al ion alone but to a non-aqueous solution containing an organic solvent in addition to these ions. The reason for this particular sequence of the addition of the components is that an organic compound of silicon (such as, for example, ethyl silicate) is dissolved more uniformly in a non-aqueous solution incorporating therein an organic solvent than in a mere aqueous solution of $Mg^{2+}$ and $Al^{3+}$. Moreover, the addition of the organic solvent promotes the formation of precipitates. Then, an acid is added to the resultant solution. This addition of the acid immediately brings about evolution of silica sol in a uniformly dispersed state. To this system, an ammonia-alkaline solution of ammonium carbonate is added to induce precipitation. The desired powder composition for cordierite production is obtained by separating and drying this precipitate.

Examples of water-soluble magnesium salts advantageously usable herein include magnesium chloride, magnesium oxalate, magnesium nitrate and magnesium sulfate. Among these magnesium salts, magnesium chloride proves particularly advantageous. The reason for the selection of these particular magnesium salts is that they are easier to handle, are less expensive, and have less possibility of causing environmental pollution than other magnesium salts.

Examples of water-soluble aluminum salts advantageously usable herein include aluminum chloride, aluminum nitrate, aluminum sulfate, and aluminum fluoride. Among these aluminum salts enumerated above, aluminum chloride and aluminum sulfate prove particularly desirable. The reason for the selection of these particular aluminum salts is that they are easier to handle, are less expensive, and have less possibility of causing environmental pollution than other aluminum salts.

In the aforementioned non-aqueous solution, the concentration of the aluminum salt is required to fall in the range of 5 to 20 g/liter as aluminum, that of the magnesium salt in the range of 5 to 20 g/liter as magnesium, that of the organic silicon compound in the range of 10 to 50 g/liter as silicon, and that of the organic solvent in the range of 0.5 to 1.5 g per 1 g of water. The most desirable concentration of aluminum is about 10 g/liter, that of magnesium about 12 g/liter, and that of silicon about 45 g/liter.

When the components have concentrations exceeding the upper limits indicated above, the formed precipitate is too viscous to permit thorough stirring of the solution. When the components have concentration falling short of the lower limits indicated above, the manufcture of the powder composition turns out to be uneconomical because the product is obtained in low yields and the steps of separation and desiccation of the precipitate consume much time.

The numerical data mentioned above are based on the assumption that the desired powder composition is $2MgO.2Al_2O_3.5SiO_2$ and ethyl silicate is used as the organic silicon compound. Except under special conditions, these numerical values can be used as the standard.

Examples of organic silicon compounds advantageously usable herein include ethyl silicate, methyl silicate, and ethyl trimethylsilyl acetate. Among them, ethyl silicate proves to be particularly desirable. Ethyl silicate is readily available on the market and is relatively cheap. Examples of water-soluble organic solvents advantageously usable herein include methanol, ethanol, propanol, acetone, and ethylene glycol. Among them, ethanol is most desirable. Isopropanol proves to be nearly as desirable as ethanol. The reason for the selection of these organic solvents is that they have no toxicity, are relatively inexpensive, and are easy to handle.

Examples of the acids advantageously usable for the purpose of the addition include hydrochloric acid and acetic acid. And hydrochloric acid is the best choice. The suitable amount of the acid for this addition is in the range of 0.1 to 0.2% based on the acid moiety of the organic silicon compound (such as ethyl silicate). If the amount falls outside this range, the activity of the added acid as a catalyst is not sufficient.

For the formation of the precipitate, the ammonia-alkaline solution of ammonia carbonate is used. The reason for the choice of this particular solution is that while ammonia carbonate, in its ordinary aqueous solution, does not have sufficient concentration, ammonium carbonate dissolved in aqua ammonia does have sufficient concentration. $6N—(NH_4)_2CO_3$ indicated in the Examples is an ammonia-alkaline ammonium carbonate solution. When this solution is added, the solubility of the magnesium component is decreased and the magnesium component nearly completely precipitates.

The powder composition which is obtained by this invention is a homogeneous super-fine active powder having a particle diameter of not more than abut 1 $\mu$m. This powder has an extremely wide range of firing temperature. By firing, therefore, this composition is readily converted into cordierite.

When the composition of this powder is the theoretical composition of cordierite, synthesis of cordierite alone can be easily effected as described above. When the composition deviates from the theoretical composition as in the formulation of $2MgO.3Al_2O_3.7SiO_2$, for example, mullite-type cordierite (cordierite having mullite in coexistence) is identified.

When cordierite is synthesized by firing natural raw materials or ordinary chemical-grade powders in accordance with the conventional method, the various minerals such as, for example, enstatite, mullite, and $\gamma$-alumina appear in X-ray diffraction analysis. At the same time that they disappear, the mixture is converted into cordierite. The cordierite thus formed also tends to undergo mullitization with ease. By the conventional method, therefore adjustment of the conversion of the mixture to cordierite is extremely difficult. In contrast, during the synthesis according to the method of this invention, the mixture produces spinel and this spinel is converted into cordierite. Thus, the synthesis of cordierite by the method of this invention is obtained in a wide range of temperatures as described above. Further, the preparation of a sintered article which is effected by molding the synthesized cordierite powder in a desired shape and then firing the molded mass is readily obtained in a similarly wide range of temperatures. Further, the cordierite produced from the powder composition of this invention is characterized by not exhibiting the orientation observed in the cordierite obtained from natural raw materials but enabling trace components to be uniformly incorporated therein with ease when necessary.

As a silicon source, at least one member selected from among finely divided silica, silica sol, and silica gel can be added. In this case, the one silica source selected from among silicon oxide, silica sol, and silica gel as suspended in water and the water-soluble organic solvent are stirred with the water-soluble magnesium salt and the water-soluble aluminum salt. In this case, the water-soluble salts and the silicon compound must be added in such amounts that in the resultant solution, their percentage composition corresponds to a desired powder composition for cordierite. In this case, the amounts and kinds of the salts and organic solvent in the solution and the effects of their addition are generally similar when an organic silicon compound is used. As a silicon component, at least one member from among finely divided silica, silica sol, and silica gel is used. The amount of the silicon component computed as silicon is the same when an organic silicon compound is used and when the one member selected as described above is used. The effect of the use of the finely divided silica powder improves in proportion as the fineness of the powder increases. The upper limit of the particle diameter is about 2 $\mu$m. When the finely divided silica is used, the concentrations of the salts are desired to be lowered to one third to one fifth of those required when an organic silicon compound is used instead. Silica sol or silica gel can be prepared as easily as the finely divided silica powder. The production of a powder composition from the mixed solution of an organic solvent, salts, and a silicon compound is accomplished in entirely the same manner as in the aforementioned production involving use of an organic silicon compound. The powder thus produced has a particle diameter of not more than about 3 μm.

The procedure using silica powder, silica sol, or silica gel is more or less inferior to the procedure using an organic silicon compound in terms of the fineness of the produced powder. The silica is less expensive and permits simpler handling than an organic silicon compound. During the application of heat required for the conversion of the powder composition into cordierite, the silica consumes more time for its disappearance than the organic silicon compound. This delayed disappearance, however, offers no practical hindrance whatever to the production of cordierite.

The powder composition obtained by the method of the present invention produces a desired cordierite more readily than the powder obtained by the conventional method as demonstrated by the following experiment.

EXPERIMENT $MgCl_2.6H_2O$, $AlCl_2.6H_2O$, and ethyl silicate 40 (having a silica content of 40%) were mixed in amounts calculated to correspond to the theoretical percentage composition of cordierite $2MgO.2Al_2O_3.5SiO_2$ and the resultant mixture was treated by the conventional incomplete solution method (coprecipitation method) to produce a precipitate. The precipitate was centrifugally separated and dried with infrared rays to afford a powder.

Then the same raw materials were treated by the method of this invention, to afford a powder. The two powders were fired at varying temperatures indicated in the following table for one hour. The products were subjected to X-ray diffraction analysis. The diffraction charts were examined to determine diffraction curves of the cordierite products and to note whether or not diffraction curves of substances other than cordierites were present.

TABLE

| | Synthesis of $2MgO.2Al_2O_3.5SiO_2$ | | | | | | |
|---|---|---|---|---|---|---|---|
| | Intensity of X-ray diffraction of cordierite | | | Substance other than cordierite | | | |
| Method of synthesis | | | | | | | |
| Burning temperature | 1300° C. | 1350° C. | 1400° C. | 1300° C. | 1350° C. | 1400° C. | 1420° C. |
| Conventional method | 0.5 | 0.7 | 0.5 | Mullite | Mullite | Mullite | Mullite |
| Method of this invention (1) | 0.9 | 1.0 | 0.9 | Spinel | None | None | Mullite |
| (2) | 0.7 | 0.9 | 0.8 | Spinel | None | None | Mullite |

(1) Ethyl silicate and (2) silica sol were respectively used as the silicon source.

In the experiment according to the conventional method, the raw materials were used in amounts calculated to correspond to the theoretical percentage composition of cordierite composition. The precipitate formed consequently was found to possess a percentage composition of $2MgO.2.2Al_2O_3.5.6SiO_2$ and, therefore, failed to acquire the theoretical percentage composition.

Comparison of the data given in this table clearly indicates the method of this invention to be superior to the conventional method.

Now the present invention will be described specifically below with reference working examples and comparative experiments.

EXAMPLE 1

$MgCl_2.6H_2O$, $AlCl_3.6H_2O$ available in the form of high-pure grade reagents (purity close to 100%; superpurity reagent) and ethyl silicate 40 (having a silica content of 40%) were weighed out in amounts calculated to give 100 g of a theoretical cordierite composition of $2MgO.2Al_2O_3.5SiO_2$. $MgCl_3.6H_2O$ and $AlCl_3.6H_2O$ in the amounts indicated above were dissolved in 500 cc of water. In this solution, 500 cc of ethanol and the ethyl silicate in the amount indicated above were stirred. Subsequently, 40 cc of hydrochloric acid was added as an acidic catalyst and stirred. Thereafter, 200 cc of 6N—$(NH_4)_2CO_3$ was added and stirred again. The precipitate which occurred consequently was centrifugally separated and dried with infrared rays to obtain 98.8 g of powder composition having a particle diameter of not more than 0.5 μm. The product was found by analysis to comprise 13.5% of MgO, 35.1% of $Al_2O_3$, and 52.4% of $SiO_2$, which represent proportions approximating the theoretical percentage composition of cordierite. When this powder was fired at 1400° C. for one hour, it was confirmed by X-ray analysis to have been completely converted into cordierite.

COMPARATIVE EXPERIMENT 1

The same raw materials as used in Example were treated by a co-precipitation method instead of the method of the present invention, to afford a powder having the theoretical percentage composition of cordierite. When this composition was fired at 1400° C. for one hour, the X-ray diffraction chart obtained of this composition identified diffraction curves of cordierite and diffraction curves of mullite.

EXAMPLE 2

The same raw materials as used in Example 1 were weighed out in amounts calculated to give 100 g of a cordierite composition comprising 11.0% of MgO, 45.0% of $Al_2O_3$, and 44.0% of $SiO_2$. By treating these raw materials by the procedure of Example 1, there was obtained 99.2 g of a powder composition having a particle diameter of about 0.5 μm. By chemical analysis, this composition was shown to comprise 10.7% of MgO, 45.1% of $Al_2O_3$, and 44.2% of $SiO_2$. When this composition was fired at 1400° C. for one hour, the product of firing was shown by X-ray analysis to comprise cordierite and a small amount of mullite.

COMPARATIVE EXPERIMENT

A powder was obtained by treating the same raw materials as involved in Example 1 by a co-precipitation method instead of the method of this invention. When this powder was fired under the same conditions as those of Example 1, the product of firing was shown by X-ray analysis to comprise cordierite, a large amount of mullite, and a small amount of $\alpha$-$Al_2O_3$.

EXAMPLE 3

$MgCl_2.6H_2O$ and $AlCl_3.6H_2O$ available in the form of high-purity grade reagents and finely powdered silica (having a particle diameter of not more than 2 μm) available in the form of a super-purity grade reagent were weighed out in amounts calculated to give 20 g of a theoretical cordierite composition of $2MgO.2Al_2O_3.5SiO_2$. First, $MgCl_2.6H_2O$, and $AlCl_3.6H_2O$, and finely powdered silica in the amounts indicated above were placed in water (500 cc) and stirred. In the solution, 400 cc of ethanol was mixed by thorough stirring. Then, 200 cc of $6N-(NH_4)_2CO_3$ was added thereto and stirred. The precipitate consequently produced was centrifugally separated and dried with infrared rays to obtain 19.8 g of powder composition having a maximum particle diameter of 2 μm.

This powder was found by analysis to comprise 13.6% of MgO, 35.5% of $Al_2O_3$, and 50.9% of $SiO_2$, which represent proportions approximating the theoretical percentage composition of cordierite. About 3 g of this powder was compression molded into discs 28 mm in diameter and about 3 mm in thickness under 500 $kg/cm^2$ of pressure. When the discs were fired at 1375° C. for one hour in an electric furnace using SiC heaters, the sintered discs were found by X-ray analysis to consist solely of cordierite. The thermal expansion coefficient of the discs from room temperature to 960° C. was $2.1 \times 10^{-6}$.

COMPARATIVE EXPERIMENT 3

When the procedure of Example 3 was repeated without using ethanol, the discs were found by X-ray analysis to contain cristobalite. The thermal expansion coefficient was $2.8 \times 10^{-6}$.

EXAMPLE 4

To obtain 20 g of a $2MgO.2Al_2O_3.5SiO_2$ composition by using $MgCl_2.6H_2O$ and $AlCl_3.6H_2O$ each available in the form of a first-purity grade reagent (having a purity of 99%) and finely divided high-purity silica (anhydrous, made by Marine Claud Corp.), first 5.9 g of $MgCl_2.6H_2O$ and 12.6 g of $AlCl_3.6H_2O$ were dissolved in 500 cc of water, 500 cc of acetone ($CH_3COCH_2OH$) was added and stirred, then 10.3 g of the high-purity silica was added and 200 cc of $6N-(NH_4)_2CO_3$ was added and stirred. The precipitate consequently formed was centrifugally separated and dried with infrared rays to obtain 20.3 g of a powder composition having a maximum particle diameter of about 2 μm.

About 3 g of this powder was compression molded into discs 28 mm in diameter and about 3 mm in thickness under 500 $kg/cm^2$ of pressure. In an electric furnace using SiC heaters, the discs were fired at 1400° C. for one hour to produce sintered discs.

They were shown by X-ray diffraction analysis to consist solely of cordierite. The average thermal expansion coefficient from room temperature to 960° C. was $2.0 \times 10^{-6}$. The firing shrinkage was as low as 5.3% in the direction of pressure application and in the direction perpendicular thereto. The water absorption was 17%. They showed high refractoriness.

EXAMPLE 5

The procedure of Example 1 was repeated by using a sol of silica concentration of 32% obtained by hydrolyzing ethyl silicate in one run and pulverized silica gel (having a water content of 37.5%) in another run, respectively in the place of finely powdered silica. By performing the treatment under the same conditions, there were obtained powder compositions.

When they were fired at 1200° C. for one hour, they were found by X-ray analysis to contain spinel in addition to cordierite. As the temperature further rose, the diffraction line of spinel disappeared, indicating that the compositions were completely converted into cordierites.

Their thermal expansion coefficients from room temperature to 960° C. were in the range of from 2.0 to $2.1 \times 10^{-6}$. The results were similar when organic silicon compounds and finely divided silica were used. Increase of thermal expansion due to the presence of mullite or cristobalite was not observed.

What is claimed is:

1. A method for the manufacture of a powder composition for cordierite, which comprises preparing water containing a water-soluble magnesium salt, a water-soluble aluminum salt, and at least one silicon source selected from the group consisting of (a) an organic silicon compound and (b) at least one member selected from the group consisting of finely divided silicon oxide, silica gel, and silica sol in amounts calculated to correspond to a cordierite percentage composition as Mg, Al, and Si, mixing this water with a water-soluble organic solvent thereby producing a mixed solution, then adding to said mixed solution an ammonia-alkaline ammonium carbonate solution thereby inducing precipitation, and separating and drying the precipitate.

2. A method for the manufacture of a powder composition for cordierite, which comprises, preparing an aqueous solution having dissolved therein a water-soluble magnesium salt and a water-soluble aluminum salt, then adding to said aqueous solution a water-soluble organic solvent, and further adding thereto first an organic silicon compound and then an acid, with said salts and organic silicon compound used in amounts calculated to correspond to a cordierite percentage composition.

3. The method according to claim 1, wherein the mixed solution of the water containing Mg, Al, and Si in the proportions corresponding to a cordierite percentage composition and the water-soluble organic solvent is produced by preparing an aqueous solution having dissolved therein a water-soluble magnesium salt, a water-soluble aluminum salt, and at least one member selected from the group consisting of finely divided silicon oxide, silica sol, and silica gel, and then adding to said aqueous solution a water-soluble organic solvent, with said salts and silicon oxide used in amounts calculated to give said proportions.

4. The method according to claim 1, 2 or 3, wherein the water-soluble organic solvent is at least one member selected from the group consisting of methanol, ethanol, propanol, acetone, and ethylene glycol.

* * * * *